United States Patent [19]

Mycynek

[11] 4,309,724
[45] Jan. 5, 1982

[54] DUAL TIME CONSTANT AFC FILTER
[75] Inventor: Victor G. Mycynek, Des Plaines, Ill.
[73] Assignee: Zenith Radio Corporation, Glenview, Ill.
[21] Appl. No.: 179,389
[22] Filed: Aug. 18, 1980
[51] Int. Cl.³ .............................................. H04N 5/50
[52] U.S. Cl. .................................. 358/195.1; 358/165
[58] Field of Search ................. 358/195.1, 165, 191.1, 358/193.1; 455/164, 173, 182, 192, 260, 265

Primary Examiner—John C. Martin
Attorney, Agent, or Firm—Jack Kail; John H. Coult

[57] ABSTRACT

An AFC circuit for a television system having stereophonic sound is disclosed. In response to a channel change, which causes a significant change in the level of the AFC error signal, the error signal is coupled substantially without modification to the local oscillator control terminal and the sound is muted. After an interval sufficient to permit frequency lock to be achieved the error signal is then coupled to the oscillator through a low pass filter and the muting operation is terminated.

7 Claims, 2 Drawing Figures

DUAL TIME CONSTANT AFC FILTER

BACKGROUND OF THE INVENTION

This invention is generally directed to improvements in television receivers, and specifically to AFC (automatic frequency control) filters for use in such receivers.

Television receivers typically include a tuner whose local oscillator develops a high frequency signal which is mixed with an incoming television signal to develop an IF (intermediate frequency) signal. Because it is important to carefully control the frequency of the local oscillator's signal, the receiver includes AFC circuitry which develops an error signal whose value is a function of any error in the local oscillator's frequency. That error signal is applied via an AFC filter to the local oscillator to adjust its frequency of oscillation such that the IF signal's picture carrier is at 45.75 megahertz.

Due to the way in which the error signal is ordinarily developed, it contains unwanted vertical and horizontal rate components and their harmonics which can frequency modulate the local oscillator. In the mixing process, both the 45.75 megahertz picture carrier and the 41.25 megahertz sound carrier take on the undesirable frequency modulation carried by the local oscillator. When such modulation occurs, the 45.75 megahertz picture carrier and the 41.25 megahertz sound carrier associated with the incoming signal become frequency modulated.

In so-called "inter-carrier" sound systems, the video and audio carriers are recovered from the IF signal by a common detector. Hence, most unwanted modulation components (due to the above-described modulation of the local oscillator) are somewhat mutually cancelling from both carriers. The unwanted modulation components which remain do not substantially effect faithful reproduction of monophonic sound.

In so-called "split sound" systems, the audio portion of the incoming signal is detected separately from the video portion. Hence, no cancelling of unwanted modulation components occurs, and those components are in the frequency spectrum which is reproduced. Consequently, "buzz" is developed in the reproduced audio.

To reduce the amount of buzz developed in a split sound system, the AFC filter requires a relatively long time constant in order to reduce the amplitude of the horizontal and vertical rate components in the error signal. However, the latter requirement conflicts with an equally important requirement that the AFC filter have a short time constant in order to cause the local oscillator to quickly lock to its required frequency. A solution to these conflicting requirements in the design of an AFC filter is provided by the present invention.

OBJECTS OF THE INVENTION

It is a general object of the invention to provide an improved AFC filter for use in a television receiver.

It is a more specific object of the invention to provide an AFC filter which permits the receiver's local oscillator to quickly lock to its proper frequency and which also substantially reduces horizontal and vertical rate modulation of the local oscillator, particularly in a receiver employing a split sound system.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
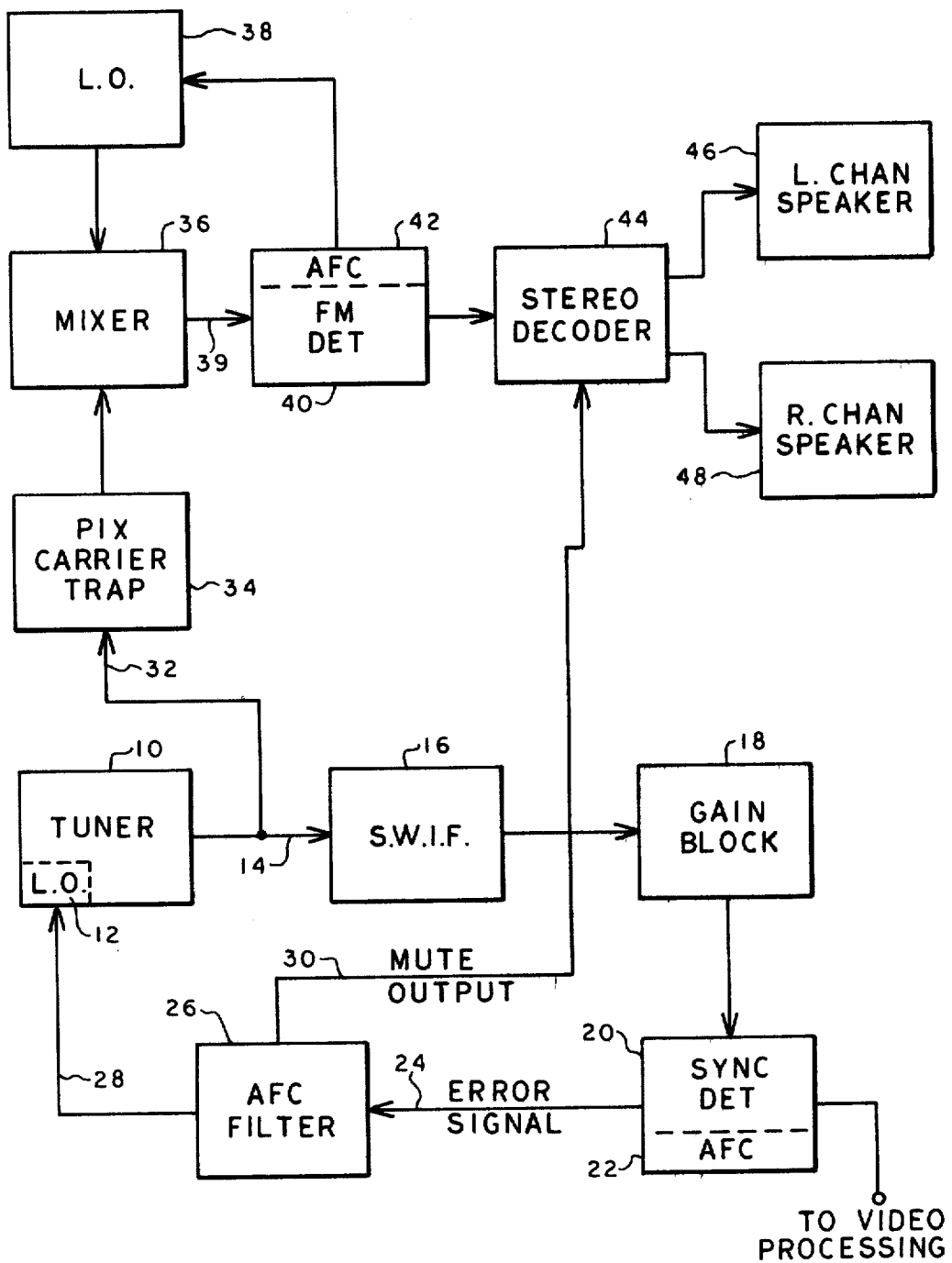
FIG. 1 is a block diagram of a portion of a television receiver illustrating the relationship of the AFC filter to the other components in the receiver.

Referring now to FIG. 1, an exemplary split sound television system is shown to illustrate a preferred use of the invention. The television system includes a tuner 10 having a local oscillator 12 for converting a received television signal to an IF signal. The latter signal is coupled via a lead 14 to an IF amplifier which may comprise a S.W.I.F. (surface wave integratable filter) 16 and a gain block 18. The output of the gain block 18 is coupled to a synchronous detector 20 for detecting the composite video information in the If signal. The detected video information is coupled to conventional video processing circuitry (not shown) for developing a television image in the usual manner.

The synchronous detector 20 may also include AFC circuitry 22 for developing on a lead 24 an error signal whose value is a function of the mistuning of the local oscillator 12. In normal operation, the local oscillator 12 is tuned so that the mixed output of the tuner 10 includes a video carrier whose frequency is equal to 45.75 megahertz. Any deviation in that frequency is indicative of local oscillator mistuning, and the AFC circuitry 22 develops the error signal for adjusting the local oscillator to its correct frequency.

At this point, it should be recalled that the error signal will ordinarily include vertical and horizontal rate components which can modulate the local oscillator 12. In the illustrated split-sound system, such modulation causes buzz to be developed in the receiver's audio output. To eliminate or substantially reduce the undesired components of the error signal, an AFC filter 26 is included between the AFC circuitry 22 and the local oscillator 12. As described in more detail hereinafter, the filter 26 includes a short time constant signal path for quickly coupling the error signal in a substantially unmodified form directly to the local oscillator via a lead 28 so that it may rapidly lock to its correct frequency. During the local oscillator's rapid frequency lock interval, horizontal and vertical rate components are included in the error signal appearing on the lead 28. To eliminate audible buzz which may be produced during that interval, the filter 26 develops a mute output signal on a lead 30 for temporarily disabling the receiver's sound system.

Once the local oscillator has had an opportunity to lock to its correct frequency, the filter 26 discontinues outputting an unfiltered error signal, terminates its mute output signal, and begins outputting a filtered error signal for holding the local oscillator to its correct frequency.

Referring again to the tuner 10, its output is also coupled via a lead to a picture carrier trap 34 which constitutes the input to the receiver's split-sound system. The trap 34 is designed to eliminate the 45.75 megahertz picture carrier to prevent the latter from interferring with the reproduction of sound.

The output of the trap 34 is coupled to a mixer 36 which also receives a 36.75 megahertz oscillator signal from a sound local oscillator 38. Consequently, the mixer 36 outputs the 4.5 megacycle sound carrier on a lead 39 for application to an FM detector 40. The latter device usually includes AFC circuitry 42 for holding the oscillator 38 to its correct frequency.

The audio signal developed by the detector 40 may be coupled to a conventional stereo decoder 44 which drives a left channel speaker 46 and a right channel speaker 48. As shown, the stereo decoder may be turned off by the mute output signal from the filter 26 so as to disable the sound system.

Figure 2:
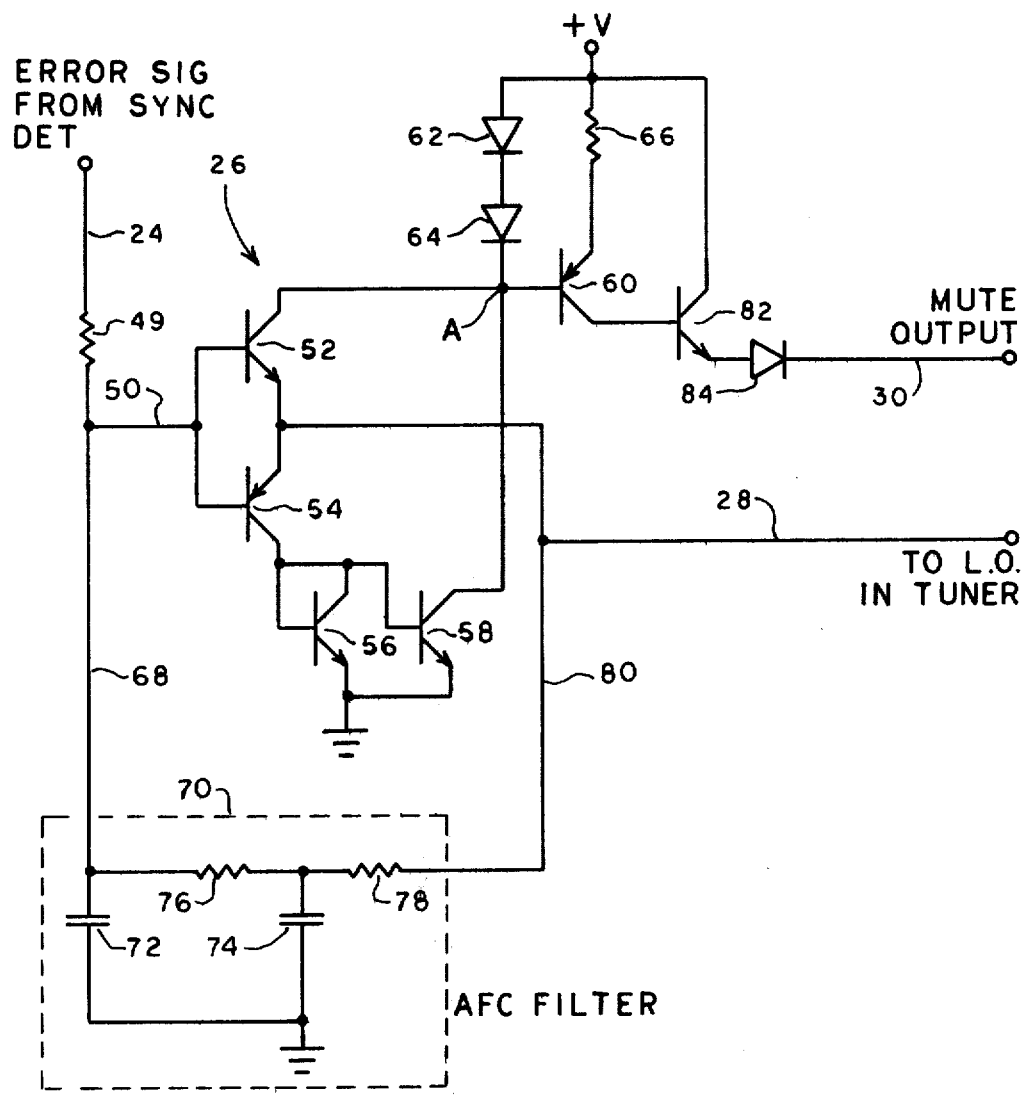
FIG. 2 is a detailed circuit diagram of a preferred embodiment of the AFC filter shown in FIG. 1.

Referring now to FIG. 2, a preferred embodiment of the AFC filter 26 is shown. The illustrated filter receives the error signal from the AFC 22 on the lead 24 and couples it through a resistor 49 to a first short time constant signal path which includes a lead 50 and a pair of transistors 52 and 54. In the present embodiment, the transistor 52 is of the NPN type and is adapted to receive the input error signal at its base. The emitter of the transistor 52 is coupled to the filter's output lead 28. The transistor 54 is of the PNP type and also receives the input error signal at its base, the emitter of the latter transistor being coupled to the output lead 28.

Shown coupled to the transistors 52 and 54 is a muting circuit comprising transistors 56, 58 and 60, a pair of diodes 62 and 64, and a resistor 66. This circuitry is described in more detail hereinafter.

The input error signal is also coupled from the resistor 49 to a second long time constant signal path comprising a lead 68 and an RC filter 70. The latter filter includes capacitors 72 and 74 and resistors 76 and 78 interconnected as shown for filtering horizontal and vertical rate components from the input error signal. The output of the RC filter 70 is coupled via a lead 80 to the AFC filter's output lead 28.

The operation of the filter 26 may more easily be described by first ignoring the effect of the muting circuitry and assuming that the collectors of transistors 52 and 54 are coupled to a positive supply voltage and ground, respectively. When the receiver's channel is changed, the input error signal at lead 24 normally changes from its previous value by one volt or more. If the error signal goes positive, the transistor 52 turns on for coupling the input error signal directly to the output lead 28. If the error signal goes negative, the transistor 54 turns on for coupling the input error signal to the output lead 28. Hence, transistors 52 and 54 act essentially as emitter followers for quickly coupling the input error signal (including horizontal and vertical rate components) directly to the local oscillator.

While the first signal path is operative, the local oscillator 12 is being locked to its correct frequency by the signal on the lead 28. At the same time, the transistor 52 or the transistor 54 (depending on which transistor is turned on in response to a change in the input error voltage) charges the capacitor 74 via the lead 80 and the resistor 78. The capacitor 74 is also charged somewhat by the error signal coupled thereto by the resistor 76 and the lead 68. After a short charging interval which is sufficient to permit the local oscillator 12 to lock on frequency, the capacitor 74 becomes fully charged so that the D.C. voltage on the lead 80 is substantially the same as the D.C. voltage on the lead 50. When that occurs, the transistors 52 and 54 are biased off. Because the amplitude of A.C. variations in the input error signal do not ordinarily exceed about 0.3 volts, they cannot turn on either of the transistors 52 or 54. Consequently, the short time constant signal path is disabled and the long time constant signal path becomes controlling.

The capacitor 74 operates to filter most of the unwanted A.C. components from the input error signal, and a standard AFC time constant is provided by the combination of the resistor 49 and the capacitor 72. With this arrangement, the error signal which is coupled to the lead 28 is filtered so that undesired modulation of the local oscillator 12 is avoided and buzz is eliminated from the reproduced sound.

It will be recalled that, when the short time constant path was operative, an unfiltered error signal was coupled to the output lead 28. Hence, during that short interval, the receiver's local oscillator 12 was modulated by horizontal and vertical rate components in the error signal on the lead 28. To avoid reproducing sound which would include a buzz component during that interval, the muting circuitry senses the operativeness of the short time constant path and develops a mute output signal at lead 30.

The muting function is provided by sensing when either of the transistors 52 and 54 are conductive and turning on the transistor 60 to develop the mute output signal which is coupled to the lead 30 via an amplifying transistor 82 and a diode 84. To sense when either of the transistors 52 and 54 are conductive, the collector of the transistor 52 is coupled to a node A. A current proportional to the collector current of the transistor 54 is developed by transistors 56 and 58, and the latter current is also coupled to the node A. When either of the transistors 52 and 54 are on, the voltage at node A is reduced to the point where the transistor 60 is turned on for developing a mute signal at its collector.

The diodes 62 and 64 are coupled to the node A to hold the voltage at the collector of transistor 52 at a level which insures that the latter transistor remains in its normal region of operation. The diodes also limit the current conducted by the transistor 60.

With the dual time constant filter described above, the local oscillator 12 is quickly locked to its correct frequency while the receiver's sound system is muted. After an interval sufficient to permit frequency lock by the local oscillator, a filtered error signal is fed to the local oscillator to hold it at its proper frequency of operation, and the sound system is activated. With this arrangement, the local oscillator becomes locked to its proper frequency as fast as conventional AFC filters permit, and yet no buzz in reproduced by the receiver's sound system.

Although the invention has been described in terms of a preferred structure, it will be obvious to those skilled in the art that many modifications and alterations may be made without departing from the invention. Also, the AFC filter may be employed in receivers other than those having a split sound system. Accordingly, all such alterations and modifications are deemed to be within the spirit and scope of the invention as defined by the appended claims.

What is claimed is:

1. In a television receiver having a sound system, a local oscillator, circuitry for developing an error signal for controlling the frequency of the local oscillator, and an AFC filter for filtering the error signal and coupling it to the local oscillator, an improved AFC filter comprising:

a first, short time constant signal path receiving the error signal for quickly coupling the latter signal to the local oscillator;

a second, long time constant signal path receiving the error signal for filtering horizontal and vertical rate components therefrom and for coupling the filtered error signal to the local oscillator, including means for rendering said first signal path inoperative after an interval selected to permit the local oscillator to achieve frequency lock; and means for muting the sound system in response to said first signal path being operative and for activating the sound system in response to said first signal path being inoperative.

2. An AFC filter as set forth in claim 1 wherein said first signal path includes at least a pair of transistors adapted to receive the error signal and to couple both it and horizontal and vertical rate components therein to the local oscillator, and wherein said second signal path includes an RC filter.

3. An AFC filter as set forth in claim 2 wherein said RC filter is coupled to said transistors so as to render them non-conductive after said interval.

4. An AFC filter as set forth in claim 2 wherein said transistors include an NPN transistor whose base receives the error signal and whose emitter is coupled to the local oscillator, and a PNP transistor whose base receives the error signal and whose emitter is coupled to the local oscillator.

5. An AFC filter as set forth in claim 2 wherein said muting means is responsive to either of said transistors being conductive for muting the sound system.

6. In a television receiver having a splitsound system for developing a stereo audio output, a local oscillator, circuitry for developing an error signal for controlling the frequency of the local oscillator, and an AFC filter for filtering and coupling the error signal to the local oscillator, an improved AFC filter, comprising:

a first, short time constant signal path including a pair of transistors adapted to receive the error signal and to quickly couple it to the local oscillator;

a second, long time constant signal path including an RC filter receiving the error signal for filtering horizontal and vertical rate components therefrom and for coupling the filtered error signal to the local oscillator;

means coupling said RC filter to said transistors such that the former becomes charged and turns off said transistors after a predetermined interval; and means responsive to said transistors being conductive for muting the sound system.

7. An AFC filter as set forth in claim 6 wherein said transistors include a NPN transistor and a PNP transistor, each transistor receiving the error signal at its base and coupling the error signal to the local oscillator via its emitter, and wherein said muting means includes means for coupling current conducted by both transistors to a common node and a further transistor responsive to the current received at said common node for muting the sound system.

* * * * *